US012456905B2

(12) United States Patent
Vohlgemuth

(10) Patent No.: US 12,456,905 B2
(45) Date of Patent: Oct. 28, 2025

(54) DEVICE FOR MANUFACTURING A LAMINATION STACK

(71) Applicant: Moteurs Leroy-Somer, Angouleme (FR)

(72) Inventor: Patrick Vohlgemuth, Anais (FR)

(73) Assignee: MOTEURS LEROY-SOMER, Angouleme (FR)

( * ) Notice: Subject to any disclaimer, the term of this patent is extended or adjusted under 35 U.S.C. 154(b) by 187 days.

(21) Appl. No.: 18/223,879

(22) Filed: Jul. 19, 2023

(65) Prior Publication Data

US 2024/0030789 A1   Jan. 25, 2024

(30) Foreign Application Priority Data

Jul. 22, 2022   (FR) ........................................ 2207534

(51) Int. Cl.
    *B32B 41/00*    (2006.01)
    *B32B 37/00*    (2006.01)
    *H02K 15/021*    (2025.01)

(52) U.S. Cl.
    CPC ....... *H02K 15/021* (2025.01); *B32B 37/0046* (2013.01); *B32B 2457/00* (2013.01)

(58) Field of Classification Search
    CPC .... H02K 15/021; H02K 2201/15; H02K 1/16; H02K 15/02; H02K 2213/03; B32B 37/0046; B32B 2457/00
    USPC ................... 156/60, 64, 350, 351, 378, 379
    See application file for complete search history.

(56) References Cited

U.S. PATENT DOCUMENTS

2017/0163136 A1\* 6/2017 Agapiou ................ H02K 17/20

\* cited by examiner

*Primary Examiner* — Michael N Orlando
*Assistant Examiner* — Joshel Rivera
(74) *Attorney, Agent, or Firm* — Jason A. Smith; Shumaker, Loop & Kendrick, LLP

(57) ABSTRACT

Device for manufacturing a lamination stack (E) for a rotating electrical machine, each lamination having a plurality of lamination sectors with notches. The laminations providing a central bore. The device including a mandrel for receiving the stacked lamination sectors, in which the mandrel includes a mandrel body provided with longitudinal slots, bars received in the longitudinal slots of the mandrel body, the bars being magnetizable, a magnetization system for the bars, and alignment pins intended to be received in the notches of the laminations to align the notches.

15 Claims, 5 Drawing Sheets

DEVICE FOR MANUFACTURING A LAMINATION STACK

TECHNICAL FIELD

The present invention relates to rotating electrical machines, and more specifically to the manufacture of lamination stacks, notably for the stators of such machines.

BACKGROUND

It is known to make a lamination stack using laminations, each comprising a plurality of lamination sectors with notches. However, the use of sectors increases the manufacturing complexity of the lamination stack.

Indeed, when a lamination is cut as a single part, the construction of the lamination stack is quite simple. In most cases, the laminations are then threaded onto a mandrel having a diameter substantially equal to the bore in the laminations. Portions of the external diameter can be nudged in a radial direction, enabling expansion of the mandrel and taking up any play in the bore in the lamination to improve alignment, and retraction thereof releases the lamination stack once completed.

Expansion cannot be used to improve alignment of the bore when stacking lamination sectors. Indeed, an outward radial nudge would separate the sectors.

There is therefore a need for a device to easily and inexpensively produce a lamination stack, each comprising a plurality of lamination sectors.

SUMMARY

The invention is intended to address this requirement and does so, according to one aspect, using a device for manufacturing a lamination stack for a rotating electrical machine, each lamination comprising a plurality of lamination sectors with notches, the laminations having a central bore, the device comprising a mandrel for receiving the stacked lamination sectors, the mandrel comprising:
- a mandrel body provided with longitudinal slots,
- bars received in the longitudinal slots of the mandrel body, the bars being magnetizable,
- a magnetization system for the bars, and
- alignment pins intended to be received in the notches of the laminations to align the notches.

The sectors of a lamination need not be connected to each other. Said sectors may notably be separate. A lamination can have between 3 and 20 sectors, preferably between 4 and 16 sectors, for example 6 or 8 sectors.

The use of laminations in sectors advantageously helps to minimize the cutting waste inherent in cutting laminations as single parts, thereby limiting sheet-metal consumption and minimizing cutting-tool costs. It also allows different sheet metals to be used for the rotor and the stator if necessary. This for example enables cheaper sheet metals to be used for the rotor, and better quality sheet metals to be used for the stator. It also enables large-diameter machines to be made.

In the manufacturing device according to the invention, the magnetization system magnetizes the bars, which, when magnetized, can then attract the lamination sectors that come close to the mandrel body, undergoing a radial nudge from the outside towards the centre. This ensures a good final geometry of the lamination stack. This device greatly facilitates the stacking operation. Even where the position of the sectors approaching the mandrel is approximate, the sectors are automatically correctly positioned.

The device according to the invention also enables the lamination sectors to be placed during the stacking process, and such placement is possible as the sectors are held on the mandrel by the magnetization of the bars.

The mandrel of the manufacturing device is thus equipped with magnetized zones appropriately arranged to ensure the self-positioning of the sectors, and to hold said sectors in the correct position until the stacking of the laminations is completed.

Thus, the invention allows for the stacking of sectors about a mandrel, which can be automated, without the need for realignment operations, or highly accurate placement means, or any device outside the lamination stack that could impede accessibility during placement of the sectors.

Sector placement is made easier and simpler, and stacking quality is not dependent on precise placement, which can facilitate automated placement.

The sectors already in place are properly held and not liable to move. As a result, no repositioning or reshaping operations are necessary.

Laminations are highly sensitive to magnetic fields.

The mandrel body can have a central bore in which the magnetization system for the bars can be placed.

DESCRIPTION OF THE INVENTION

Mandrel Body

The mandrel body can be made of a non-magnetic material, notably a paramagnetic material. Advantageously, the mandrel body is not magnetic. This ensures the correct positioning of the sectors.

Bars

The bars can be made of a soft ferromagnetic material.

The bars can project slightly radially outwards from the mandrel body. "Slightly" means that the bars project from the mandrel body by a distance d of between 0.4 mm and 100 mm, preferably between 0.5 mm and 10 mm, or even between 0.6 mm and 2 mm, for example of the order of 0.5 mm or 1 mm. A ratio of the distance d to the radius of the mandrel body can for example be less than 20%, or preferably less than 10%, or even less than 1%.

Thus, the bars form the external diameter of the mandrel as a whole, the external diameter of the mandrel corresponding substantially to the bore diameter of the stator to be manufactured. Specifically, the external diameter of the mandrel can be very slightly larger than the bore diameter of the stator to be manufactured, so as to ensure the stable clamping of the sectors. The faces of the bars facing the lamination stack can be machined.

Furthermore, this arrangement ensures that the laminations of the stack are not in contact with the mandrel body, which facilitates the subsequent removal of the lamination stack from the mandrel, avoiding friction.

To facilitate the removal of the lamination stack from the mandrel once the stack is complete, the device may have a slope on the outer surface thereof. This can allow a slight retraction of the bars towards the longitudinal axis of the device, relative to the lamination stack. The slope may be obtained by the shape of the mandrel body, which may have an outer surface inclined at an angle α in relation to a longitudinal axis of the device, which is vertical. The bars can also be inclined in relation to a longitudinal axis of the device as a result of this inclination. Alternatively, the slope may be obtained by the shape of the bars themselves, which may include an outer surface inclined at an angle α in relation to a longitudinal axis of the device. The slope can allow a longitudinal translational movement of the bars.

The bars can be designed to be longitudinally movable. This movement can be minimal, for example between 0.5 mm and 10 mm, preferably between 1 mm and 6 mm, or between 1.5 mm and 5 mm, for example 4 mm. For this purpose, the length of the longitudinal slots of the mandrel body measured along the longitudinal axis of the device is slightly greater than the length of a bar, measured along the longitudinal axis of the device, by a length c. The length s can be for example between 0.5 mm and 10 mm, preferably between 1 mm and 6 mm, or between 1.5 mm and 5 mm, for example 4 mm.

The bars need not project radially inwards from the mandrel body, into the central bore thereof. For example, the bars may be recessed from or flush with the central bore of the mandrel body.

In a variant, the bars can project radially inwards from the mandrel body, into the central bore thereof.

Magnetization System

The magnetization system can have coils arranged on some or all of the bars in the central bore of the mandrel body.

The use of coils advantageously enables the magnetization to be modulated very flexibly. The magnetization can be started or stopped easily.

The magnetization system can for example have one coil per bar, or alternatively one coil for two bars, or one coil for three bars, notably when moving circumferentially about the mandrel body.

The coils need not be placed on the bars.

In one embodiment, the magnetization system may comprise magnetic cores carrying coils, and the magnetic cores can be driven in rotation and/or in translation in the central bore of the mandrel body.

Alternatively, the magnetization system can comprise permanent magnets, for example arranged on a cylinder that can be driven in rotation and/or in translation in the central bore of the mandrel body.

Alternatively or additionally, the permanent magnets can be activated or deactivated depending on the relative position thereof.

The magnetization of the bars can be variable. For example, the magnetization may be higher during placement of the sector adjacent to the bars, and lower when said sector is only being held on the mandrel. In particular, the magnetization at the bottom of the stack can be reduced, since the sectors are partly held there by the weight of the stack.

This can be achieved by changing the current flowing through the coils as a function of the position thereof, notably as a function of the circumferential position and/or longitudinal position thereof, along a longitudinal axis of the device.

The magnetization system can be designed so that the orientation of the magnetic fluxes about the mandrel have successive opposing poles, to improve the attractive forces of the sectors.

Rows of Bars

The mandrel can have a single circumferential row of bars about the central bore of the mandrel body.

Alternatively, the mandrel can have a plurality of circumferential rows of bars distributed longitudinally about the central bore of the mandrel body.

The mandrel can for example have between 2 and 10 circumferential rows, for example between 3 and 8 circumferential rows, and notably 2, 3 or 4 circumferential rows of bars. The circumferential rows can be evenly distributed, with consistent spacing between two consecutive circumferential rows.

The number of circumferential rows may for example depend on the length of the lamination stack, the diameter thereof, or the ratio between the length and diameter thereof.

The length of the lamination stack can for example be between 50 mm and 3 m, or between 100 mm and 2 m, preferably between 150 mm and 1.5 m, for example 200 mm, 1 m or 2 m.

A bore diameter of the lamination stack can be greater than 100 mm, preferably greater than 150 mm, or greater than 200 mm.

Alignment Pins

The alignment pins can be made of a non-magnetic material, notably a paramagnetic material. Advantageously, the pins are not magnetic, thereby facilitating and not hindering insertion of said pins into the notches of the laminations. This ensures the correct positioning of the sectors.

A width of the alignment pins in cross section can decrease further away from a longitudinal axis of the device.

The width of the pins can be substantially equal to the opening of the notches at the bore diameter of the lamination stack, notably with a slight clearance to enable sliding. Furthermore, this width may decrease as the pin extends into the corresponding notch in the lamination stack. This facilitates positioning and guidance of the sector on the pins.

The alignment pins can be received in longitudinal notches in each bar, which extend radially beyond the diameter of the central bore in the laminations.

Each of the bars can have a longitudinal notch for this purpose. A notch in a bar can be centred with respect to said bar.

Alternatively, the alignment pins can be inserted into the notches in the laminations from above, along a longitudinal axis of the device. The pins are used to align the notches of the laminations. The bars need not include said longitudinal notches, having a substantially cylindrical surface facing the lamination sectors.

The device may also include a support plate for the sectors. This support plate can be made of a non-magnetic material. The support plate can be arranged on a base of the mandrel. This support plate can also facilitate the subsequent pressing and removal of the lamination stack.

Sectors

The sectors can have notches, for example between 2 and 20 notches, or preferably between 4 and 16 notches, for example 6 or 8 notches. Each of these notches has a notch opening, the notch openings being preferably regularly and precisely distributed over the corresponding sector.

Furthermore, each sector has two lateral flanks that form the coverage angle of the sector. The lateral flanks are preferably set back very slightly from the theoretical line centred on the bore diameter of the lamination stack. It is also beneficial to limit the clearance between two consecutive sectors, in order to avoid unwanted air gaps.

Furthermore, each sector may have a central notch centred on an axis of symmetry of the sector. The sector can have an even number of notches, including an odd number of solid notches and two half-notches on each side.

Each sector may have an angular range $\beta$ between 180 and 180°, preferably between 24° and 120°, or between 30° and 90°, for example of the order of 60°. The angular range is measured in a transverse plane of the stator, perpendicular to a longitudinal axis of the device, about said axis. The angular range is defined between the side faces of the sectors, forming the interface between the sectors.

In one embodiment, each sector may have an angular range $\beta$ of 120°, with one lamination having three angular sectors, each intended to cooperate with 12 notches. In another embodiment, each sector may have an angular range β of 60°, with one lamination having six angular sectors, each intended to cooperate with six notches. In another embodiment, each sector may have an angular range β of 30°, with one lamination having 12 angular sectors, each intended to cooperate with three notches.

In one embodiment, all of the sectors have the same angular range. In one embodiment, all of the sectors are identical. The sectors can have the same angular range, shape, and arrangement of complementary surface reliefs for snap-fitting laminations together (list not exhaustive).

In one embodiment, one or all of the sectors may be partially or completely symmetrical about a plane perpendicular to a longitudinal axis, allowing the sectors to be assembled in either direction during the manufacture of the stack. The sectors can therefore be "reversible", for example every other layer. Such a design can improve the stiffness of the stator after assembly of the sectors.

In one embodiment, one or all of the sectors may be symmetrical about a plane perpendicular to a longitudinal axis.

The laminating of the sectors allows to limit eddy current losses. The lamination sectors can be bonded or stapled or welded together.

In one embodiment, one or all of the laminations may be partially or completely symmetrical about a plane perpendicular to a rotation axis of the machine, allowing the laminations to be assembled in either direction during the manufacture of the sector. The laminations can therefore be "reversible", for example every other lamination.

The lamination sectors can be grouped into sector packets, a first interface defined between two adjacent sector packets located at a first distance along the longitudinal axis of the device being angularly offset from a second interface defined between two adjacent sector packets located at a second distance along the longitudinal axis of the device, different from the first distance.

The sectors of a packet can be assembled together by snap-fitting or bonding. The assembly can be performed in a cutting tool used to cut the lamination sectors. Advantageously, the use of lamination packets facilitates stacking by reducing the number of parts to be stacked to form the lamination stack, thereby minimizing stacking time and cost. The number of sectors in a packet can be between 2 and 50, preferably between 3 and 30, or between 4 and 20, for example between 5 and 10. The number of sectors in a packet can be determined so that the number of packets obtained corresponds to the desired height or heights for a complete stack.

The angular offset can be between one and ten teeth, preferably between two and eight teeth, for example three or five teeth. In certain embodiments, there may be four teeth, or six teeth for example.

In one embodiment, the second interface is located circumferentially between the first interface and a third interface located at the same first distance. The arrangement of the interfaces is determined when the stator is viewed in cross section from the rotation axis of the machine.

The sectors can be cut out of a sheet-metal strip, in all cases in the rolling direction of the sheet-metal strip. Thus, the flow in the stack can circulate in all sectors in the rolling direction of the lamination.

The sectors can be designed to optimize material waste during cutting. For example, the angular range and/or the number of teeth and/or notches per sector can be selected for this purpose.

The sectors can be designed to optimize the magnetic flow in the stator. For example, the angular range and/or the number of teeth and/or notches per sector can be selected for this purpose.

For example, the height of the sector packets can be determined in consideration of the thickness of the laminations and the stacking factor, which is the amount of iron found in a given length of the stator. The stacking factor can depend on the thickness of the laminations, the quality of the laminations, any local defects in the lamination, rolling defects, and varnish.

All of the sectors can have an interface in a substantially radial plane between said sectors. Each interface can be contained entirely in one radial plane. Each of these interfaces can be flat.

Alternatively, the interface need not be entirely radial, and one of the sectors may include one or more reliefs intended to cooperate with one or more corresponding reliefs on the other adjacent sector. Such reliefs can help to radially immobilize one sector with respect to the adjacent sector, and keep the sectors static with respect to each other, notably radially as well as circumferentially. In this case, the interface may extend in the radial plane, except for the cooperating relief or reliefs.

The radial plane of the interface can pass through a notch, especially the middle thereof. Preferably, all of the radial planes of all of the interfaces can pass through notches, notably the middle thereof. In one embodiment, the radial plane of the interface may pass through a notch, but offset from the middle thereof. The radial plane of the interface may for example pass through the ⅓ or ⅔ or ¼ or ¾ point of the notch. Such an arrangement can interrupt any symmetry effects that could create noise.

In one variant embodiment, the radial plane of the interface may pass through a tooth, and preferably all of the radial planes of all of the interfaces may pass through teeth. In another variant embodiment, the radial planes of some of the interfaces pass through notches and other radial planes of other interfaces pass through teeth.

The lamination stack can be used for a stator of the rotating electrical machine. The laminations are stator laminations.

The invention also relates to a stator for a rotating electrical machine comprising a lamination stack manufactured with the device as described above.

Windings

The windings can be arranged in the notches in a concentrated or distributed manner. "Concentrated" means that each winding is wound about a single tooth. "Distributed" means that at least one of the windings passes successively through two non-adjacent notches. Preferably, the windings are arranged in the notches in a distributed manner, notably when the rotor comprises up to eight poles.

Each winding has at least one electrical conductor, which may be circular in cross section, or polygonal with rounded edges, preferably rectangular (list not exhaustive).

Each winding has at least one electrical conductor with a rectangular cross section, with the windings being arranged in a distributed manner in the notches.

Conductors having a circular cross section can be arranged in the notch in a hexagonal stack. Conductors having a polygonal cross section can be arranged in the notch in one or more radially oriented rows. Optimizing stacking can allow a greater number of electrical conductors to be placed in the notches, thereby providing a stator of greater power at a constant volume.

The electrical conductors can be arranged randomly in the notches or rows. Preferably, the electrical conductors are arranged in the notches. The term "arranged" means that the conductors are not placed in the notches loosely but in an orderly manner. The conductors are stacked in the notches in a non-random manner, for example in one or more rows of aligned electrical conductors, in particular in one or two rows, preferably in a single row.

Machine and Rotor

The invention also relates to a rotating electrical machine having a stator as defined above. The machine can be an engine or a generator. The power of the machine can be of the order of a few kVA, for example of the order of 10 kVA. The machine can be synchronous or asynchronous. The machine can be a reluctance machine. The machine can be a synchronous motor.

The rotating electrical machine can have a rotor. The rotor can be a wound rotor or a permanent-magnet rotor. If the machine is intended for use as an alternator, the rotor can be wound. If the machine is intended for use as a motor, the rotor can be a permanent-magnet rotor.

The rotor mass of the rotor may extend along the rotation axis and be arranged about a shaft. The shaft may include torque transmission means to drive the rotor mass in rotation.

The rotor can be overhung or otherwise.

The rotor can be made of several rotor parts aligned in the axial direction, for example three parts. Each of the parts can be angularly offset in relation to the adjacent parts (step skew). The rotor can be twisted.

Sector Placement System

The device can comprise a placement system for the lamination sectors. The placement system for lamination sectors is designed to place a sector onto the stack, with the openings of the notches in the sector facing pins. In particular, the opening of a central notch is arranged opposite a pin.

The placement system can also be designed to slide the sector towards the mandrel, with the pin or pins allowing the sector to be correctly positioned.

Once the sector is sufficiently close to the mandrel, the magnetic attraction of the magnetized bars draws the sector into contact with the mandrel, to complete and hold the positioning thereof.

The operation can then be repeated for the next sector, with an appropriate angular offset about the longitudinal axis of the device. The angular offset can correspond to the angular opening of a sector.

Once an entire layer of lamination sectors or sector packets has been placed, the next layer is placed, with an offset between the sectors or sector packets of one layer and the sectors or sector packets of the next layer. The offsetting can for example be one half-sector.

Since the sectors are held together to prevent the placement of one sector from moving an adjacent sector, the device can have multiple placement systems arranged about the mandrel. Advantageously, the rate of sector placement is accelerated.

When the stack is complete, the stack is pressed and joined together, for example by welding. The lamination stack can for example be assembled with weld seams along the external diameter thereof. For example, after pressing the stack and without releasing the pressure, the stack can be moved from the stacking device according to the invention to a welding station separate from the stacking device. This advantageously obviates the risk of contaminating the mandrel with weld spatter, as the mandrel may have some low residual magnetization.

These operations can be performed by means of a pressing and gripping system as described below.

Pressing and Gripping System

The invention also relates to a pressing and gripping system for a lamination stack, notably obtained using the device described above, comprising one or more vertical clamps designed to be clamped onto a support plate for the sector.

The pressing system can be lowered onto the lamination stack following completion thereof. Extending a cylinder rod lowers a clamping plate onto the lamination stack to clamp said stack. The pressure exerted by the cylinder rod limits the stacking factor of the laminations and holds said laminations tightly.

Furthermore, the vertical clamp or clamps are designed to be clamped to the support plate of the sectors. The sectors are clamped by lowering the clamping plate. For this purpose, the clamping plate has a vertical passage for each vertical clamp, each vertical clamp being mounted on a static upper plate and being freely rotatable. Thus, lowering the clamping plate causes the angular displacement of each vertical clamp and the clamping of the vertical clamps on the support plate.

After stacking and pressing, the magnetization can be deactivated. If necessary, a short inverse field can be applied in order to eliminate any residual field in the bars.

The bars can then be retracted and the lamination stack lifted out of the device.

The lamination stack can then be transferred to the next station of the production line, for example a welding station, where welding seams are made to ensure the complete cohesion of the lamination stack.

After cooling, the lamination stack can be fitted with insulators and a winding.

In one embodiment, the cutting and assembly station may be arranged directly upstream of the device according to the invention, but may be arranged otherwise. In this case, the sectors, possibly in packets, can be stored in racks intended to feed the device according to the invention.

Manufacturing Method

The invention further relates to a method for manufacturing a lamination stack, notably using the device described above, in which:

lamination sectors are supplied to a mandrel as described above, in particular using the placement system as described above, one or more of the bars described above are magnetized, the magnetization of the bars is released, optionally, the lamination stack is pressed, notably using the pressing system described above, optionally, the lamination stack is lifted off the device, notably using the pressing and gripping system described above.

BRIEF DESCRIPTION OF THE DRAWINGS

The invention is further explained in the detailed description given below of a non-limiting example embodiment of the invention and the attached drawings, in which.

DETAILED DESCRIPTION

Figure 1:
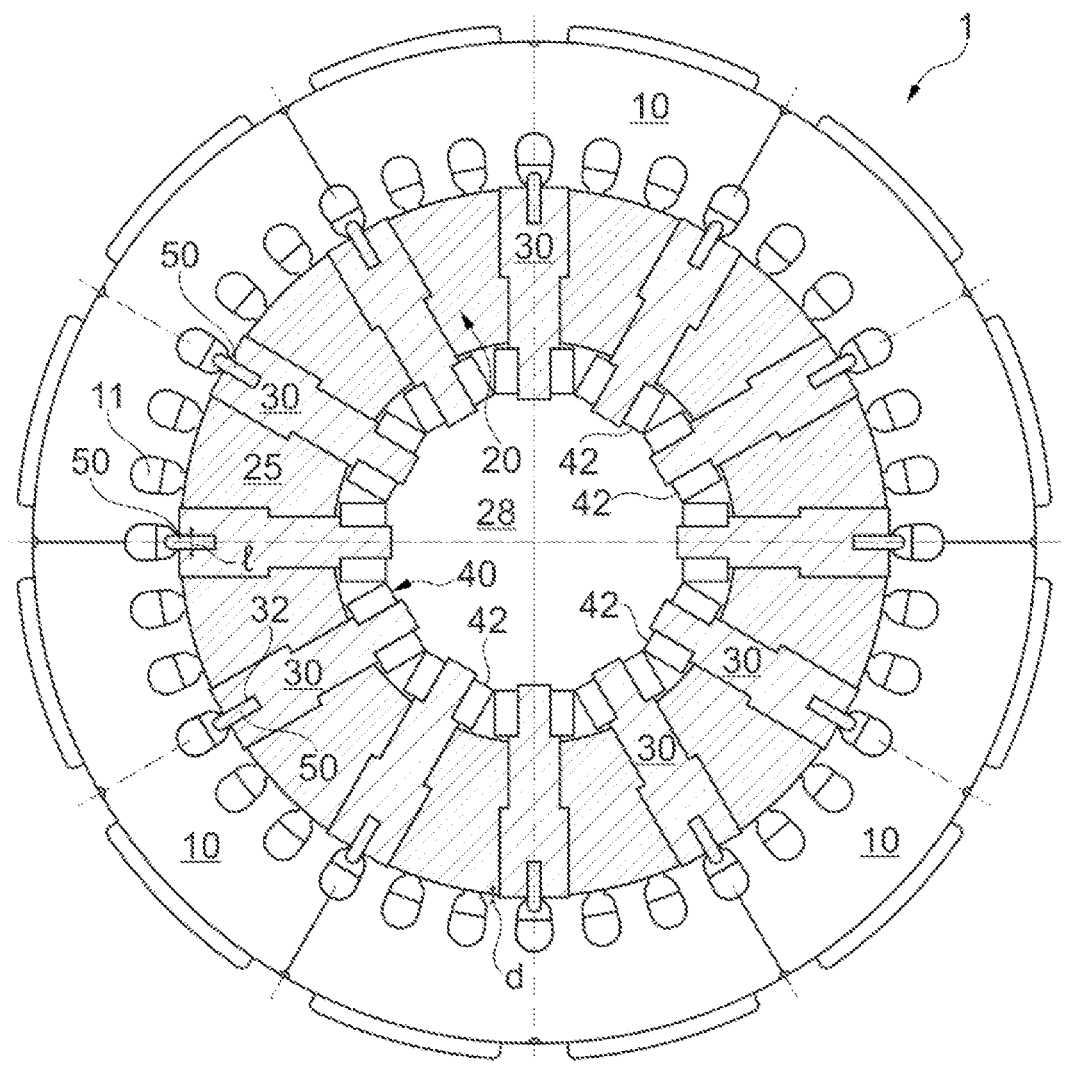
FIG. 1 is a schematic, partial cross-section view of a device for manufacturing a lamination stack for a rotating electrical machine according to the invention.

FIG. 1 shows a device 1 for manufacturing a stack E of laminations for a rotating electrical machine.

Figure 2:
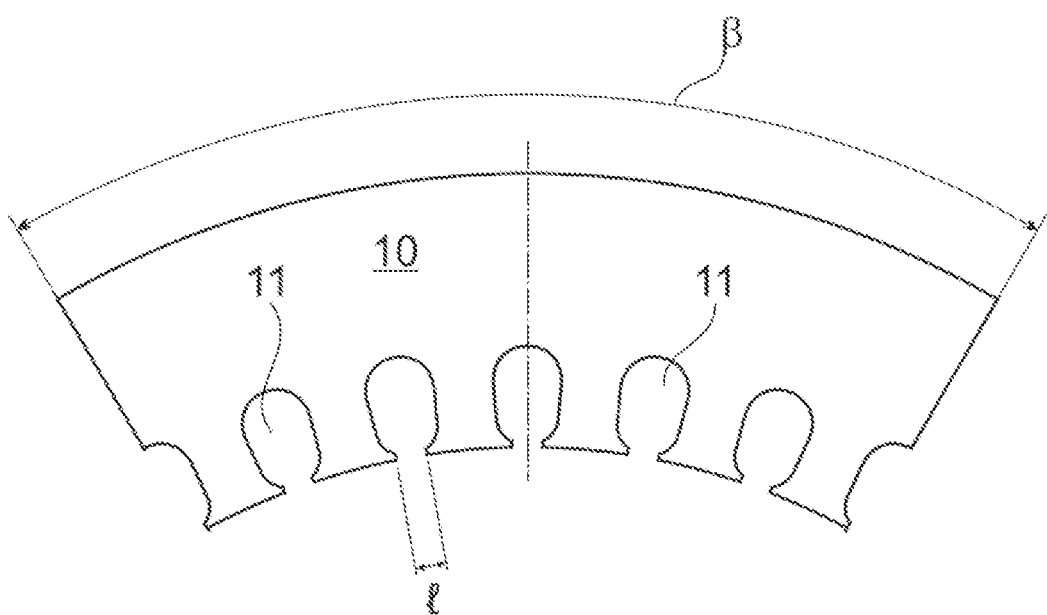
FIG. 2 is a top view of an individual sector.

Each lamination has a plurality of lamination sectors 10 with notches 11, as shown in FIG. 2. The sectors of a lamination are not connected to each other. The sectors are separated from each other. In this example, a lamination has six sectors, as shown in FIG. 1. The lamination stack is used to manufacture a stator of a rotating electrical machine. The rotating electrical machine is intended to comprise a rotor and a stator. The stator generates a rotating magnetic field to drive the rotor in rotation in a synchronous motor, and the rotation of the rotor induces an electromotive force in the windings of the stator in the case of an alternator.

The lamination sectors 10 are preferably grouped into sector packets. A first interface defined between two adjacent sector packets located at a first distance along the longitudinal axis of the device can be angularly offset from a second interface defined between two adjacent sector packets located at a second distance along the longitudinal axis of the device, different from the first distance.

The laminations provide a central bore, in which is positioned a mandrel 20 of the device 1, which receives the stacked sectors 10. The mandrel 20 comprises:
 a mandrel body 25 provided with longitudinal slots 26,
 bars 30 received in the longitudinal slots 26 of the mandrel body 25, the bars being magnetizable,
 a magnetization system 40 for the bars 30, placed in a central bore 28 of the mandrel body 25, and
 alignment pins 50 intended to be received in the notches 11 of the laminations to align the notches 11.

Figure 3:
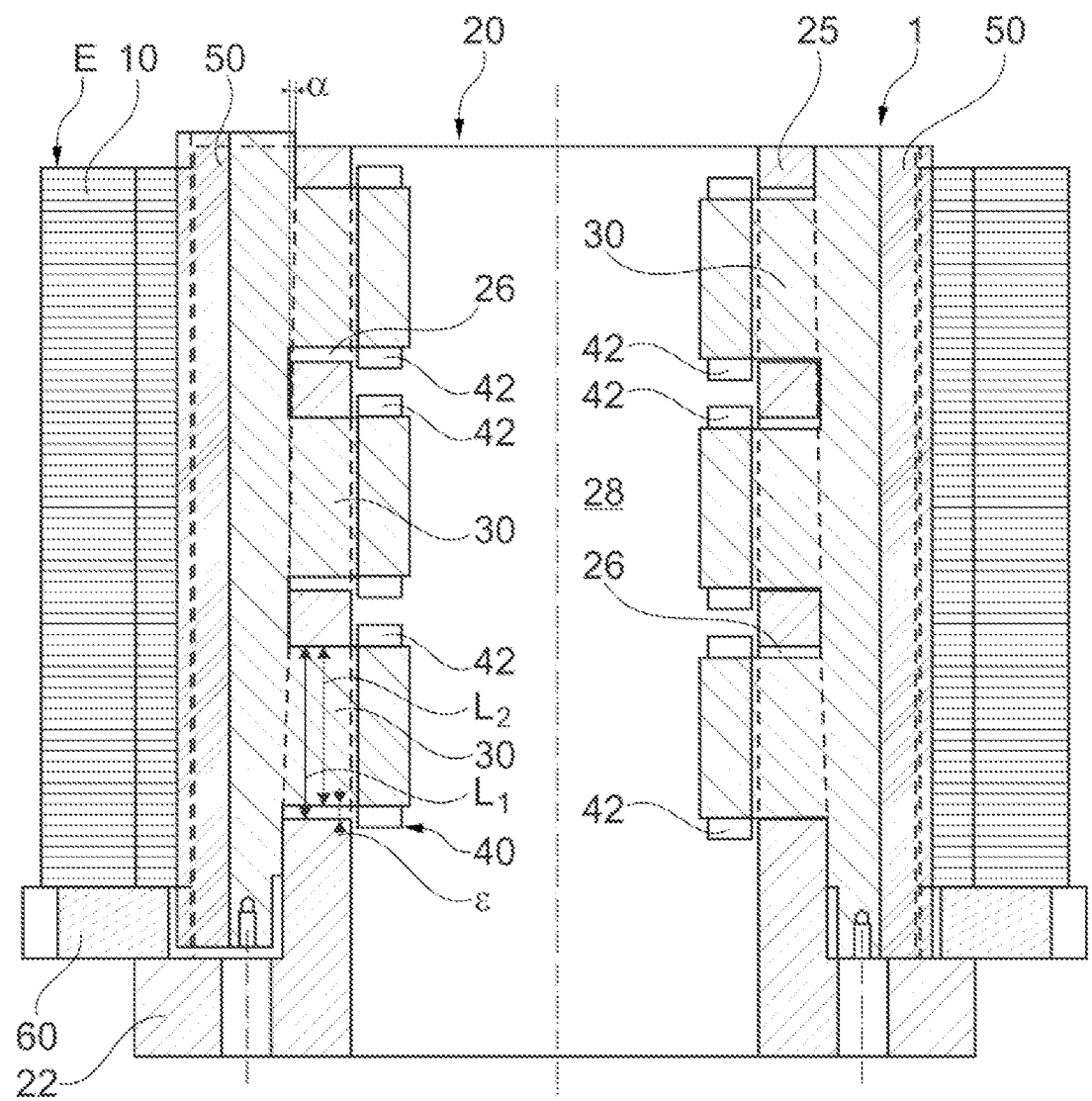
FIG. 3 is a schematic partial longitudinal cross-section view of the device in FIG. 1.

The device further comprises a support plate 60 for the sectors 10, as shown in FIG. 3. This support plate 60 can be made of a non-magnetic material. The support plate can be placed on a base 22 of the mandrel. This support plate also facilitates the subsequent pressing and removal of the lamination stack.

The mandrel body 25 is made of a non-magnetic material, notably a paramagnetic material, which does not adversely affect the correct positioning of the sectors.

The bars are made of a soft ferromagnetic material.

The magnetization system magnetizes the bars, which, when magnetized, can then attract the lamination sectors that come close to the mandrel body, undergoing a radial nudge from the outside towards the centre. Laminations are in fact highly sensitive to magnetic fields.

The device according to the invention also enables the lamination sectors to be placed during the stacking process, and such placement is possible as the sectors are held on the mandrel by the magnetization of the bars.

The sectors 10 already in place are properly held and not liable to move. As a result, no repositioning or reshaping operations are necessary.

The mandrel 20 has a plurality of circumferential rows of bars 30 distributed longitudinally about the central bore of the mandrel body. In the example described, the mandrel has three circumferential rows of bars 30, which in this example are regularly distributed, with consistent spacing between two consecutive circumferential rows. The bars 30 project radially inwards from the mandrel body into the central bore 28 thereof.

The magnetization system 40 has coils 42 arranged on the bars in the central bore 28 of the mandrel body 25. The use of coils 42 advantageously enables the magnetization to be modulated very flexibly. The magnetization can be started or stopped easily.

The magnetization of the bars 30 can be variable. For example, the magnetization may be higher during placement of the sector adjacent to the bars, and lower when said sector is only being held on the mandrel. In particular, the magnetization at the bottom of the stack can be reduced, since the sectors are partly held there by the weight of the stack.

This can be achieved by changing the current flowing through the coils 42 as a function of the position thereof, notably as a function of the circumferential position and/or longitudinal position thereof, along a longitudinal axis of the device.

Furthermore, the bars 30 protrude slightly radially outwards from the mandrel body 25, by a distance d, for example of the order of 0.5 mm. A ratio of the distance d to the radius of the mandrel body 25 may for example be less than 1%.

Thus, the bars 30 form the external diameter of the mandrel 20 as a whole, with the external diameter of the mandrel corresponding substantially to the bore diameter of the stator to be manufactured. This arrangement means that the laminations of the stack are not in contact with the mandrel body 25, which facilitates the subsequent removal of the lamination stack from the mandrel 20, avoiding friction.

To facilitate the removal of the lamination stack from the mandrel 20 once the stack is complete, the device may have a slope on the outer surface thereof, as shown in FIG. 3. This can allow a slight retraction of the bars towards the longitudinal axis of the device, relative to the lamination stack.

The slope is in this example obtained by the shape of the mandrel body 25, which has an outer surface inclined at an angle α in relation to a longitudinal axis of the device, which is vertical. The bars can also be inclined in relation to a longitudinal axis of the device. The slope can allow a longitudinal translational movement of the bars.

The bars are designed to be longitudinally movable between a stacked position shown on the right-hand side of FIG. 3, and a position in which the bars are retracted, shown on the left-hand side of FIG. 3. This movement can be small, for example of the order of 4 mm.

For this purpose, the length L1 of the longitudinal slots 26 of the mandrel body 25 measured along the longitudinal axis of the device is slightly greater than the length L2 of a bar, measured along the longitudinal axis of the device, by a length s, as shown in FIG. 3. The length c is for example of the order of 4 mm.

Furthermore, the alignment pins 50 are made of a non-magnetic material, notably a paramagnetic material, to facilitate and not hinder insertion into the notches 11 of the laminations. This ensures the correct positioning of the sectors.

A width 1 of the alignment pins 50 in cross section decreases further away from a longitudinal axis of the device. The width of the pins can be substantially equal to the opening of the notches at the bore diameter of the lamination stack, notably with a slight clearance to enable sliding, as shown in FIGS. 2 and 3. Furthermore, this width may decrease as the pin extends into the corresponding notch in the lamination stack. This facilitates positioning and guidance of the sector on the pins.

The alignment pins 50 are received in longitudinal notches 32 in each bar 30, which extend radially beyond the diameter of the central bore in the laminations. A notch 32 in a bar 30 is in this case centred with respect to said bar 30.

Figure 5:
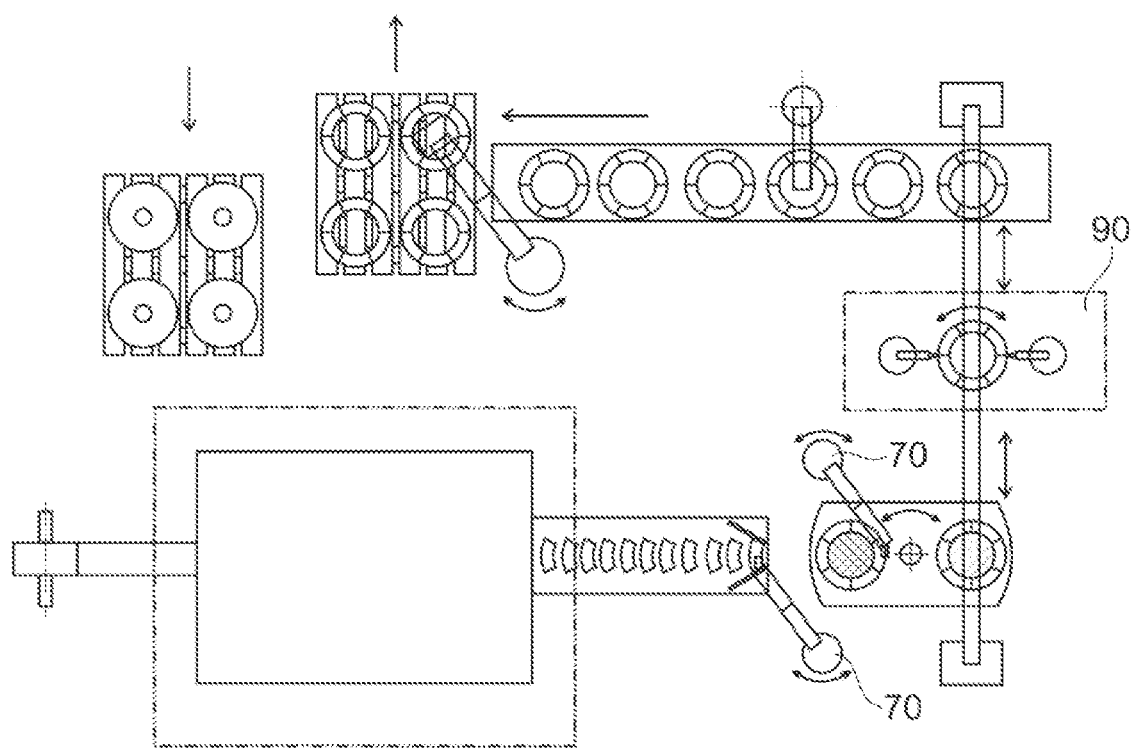
FIG. 5 is a schematic and partial top view of a production line comprising the device according to the invention.

The device also includes a placement system 70 for the lamination sectors, as shown in FIG. 5. The placement system 70 for lamination sectors is designed to place a sector onto the stack, for example using a robotic arm, with the openings of the notches in the sector facing pins. In particular, the opening of a central notch is arranged opposite a pin. The placement system can also be designed to slide the sector towards the mandrel, with the pin or pins allowing the sector to be correctly positioned.

Once the sector is sufficiently close to the mandrel, the magnetic attraction of the magnetized bars draws the sector into contact with the mandrel, to complete and hold the positioning thereof.

The operation can then be repeated for the next sector, with an appropriate angular offset about the longitudinal axis of the device, with the same robotic arm or a second robotic arm. The angular offset can correspond to the angular opening of a sector.

Once an entire layer of lamination sectors or sector packets has been placed, the next layer is placed, with an offset between the sectors or sector packets of one layer and the sectors or sector packets of the next layer. The offsetting can for example be one half-sector.

Figure 4:
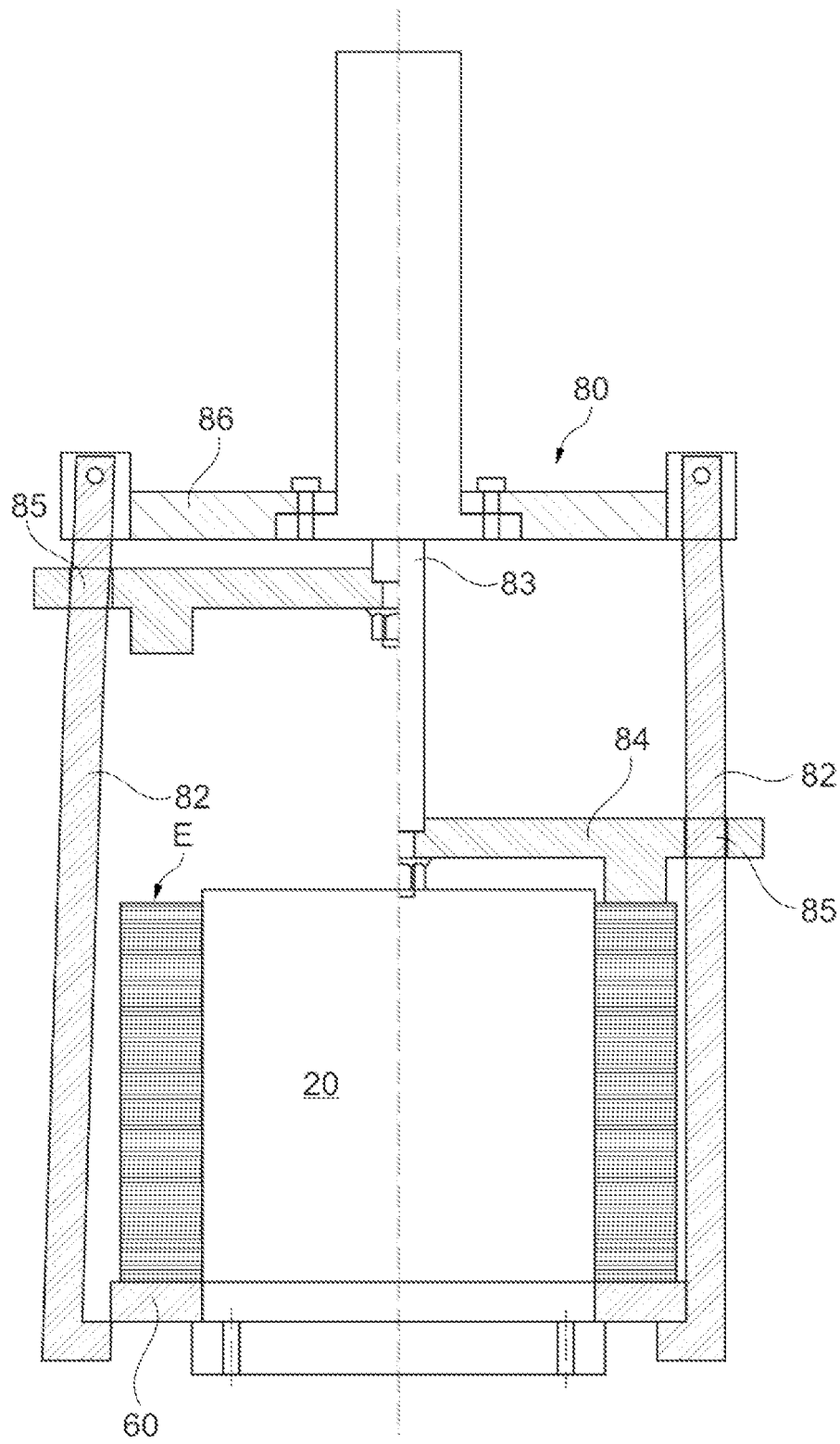
FIG. 4 is a schematic partial longitudinal cross-section view of the device in FIG. 1, with the pressing and gripping system.

When complete, the stack is pressed and removed from the device 1. These operations can be performed by means of a pressing and gripping system 80, as shown in FIG. 4. This system comprises a plurality of vertical clamps 82 designed to be clamped to the support plate 60 of the sectors.

The pressing system 80 can be lowered onto the lamination stack following completion thereof, from an open position shown on the left-hand side in FIG. 4 to a pressing position shown on the right-hand side in FIG. 4. Extending a cylinder rod 83 lowers a clamping plate 84 onto the lamination stack to clamp said stack. The pressure exerted by the cylinder rod 83 limits the stacking factor of the laminations and holds said laminations tightly.

Furthermore, the vertical clamp or clamps 82 are designed to be clamped to the support plate 60 of the sectors. The sectors are clamped by lowering the clamping plate 84, as shown in FIG. 4. For this purpose, the clamping plate has a vertical passage 85 for each vertical clamp 82, each vertical clamp 82 being mounted on a static upper plate 86 and being freely rotatable. Thus, lowering the clamping plate 84 causes the angular displacement of each vertical clamp 82 and the clamping of the vertical clamps on the support plate 60.

After stacking and pressing, the magnetization can be deactivated. If necessary, a short inverse field can be applied in order to eliminate any residual field in the bars.

The bars can then be retracted and the lamination stack lifted out of the device.

When the stack is complete, the stack is pressed and joined together, for example by welding. The lamination stack can for example be assembled with weld seams along the external diameter thereof, at a welding station 90. For example, after pressing the stack and without releasing the pressure, the stack can be moved from the stacking device according to the invention to a welding station 90 separate from the stacking device.

After cooling, the lamination stack can be fitted with insulators and a winding.

In the example described, the lamination stack comprises 36 equidistant notches intended to receive the winding of an alternator stator. The magnetic circuit is divided into six 60° sectors. Each sector has six notches, including five full notches and two half-notches. One notch is centred on the axis of symmetry of the sector.

Naturally, the invention is not limited to these values and the stator can have a different number of notches and sectors.

The invention claimed is:

1. A device for manufacturing a lamination stack (E) for a rotating electrical machine, each lamination comprising a plurality of lamination sectors with notches, the laminations having a central bore,
   the device comprising a mandrel for receiving the stacked lamination sectors, the mandrel comprising:
   a mandrel body provided with longitudinal slots,
   bars received in the longitudinal slots of the mandrel body, the bars being magnetizable,
   a magnetization system for the bars, and
   alignment pins intended to be received in the notches of the laminations to align the notches.

2. The device according to claim 1, wherein the mandrel body is made of a non-magnetic material.

3. The device according to claim 1, wherein the bars are made of a soft ferromagnetic material.

4. The device according to claim 1, wherein the bars project slightly radially outwards from the mandrel body.

5. The device according to claim 1, wherein the bars project radially inwards from the mandrel body into the central bore thereof.

6. The device according to claim 1, wherein the magnetization system has coils arranged on some or all of the bars in the central bore of the mandrel body.

7. The device according to claim 1, wherein the mandrel has a plurality of circumferential rows of bars distributed longitudinally about the central bore of the mandrel body.

8. The device according to claim 1, wherein the alignment pins are made of a non-magnetic material.

9. The device according to claim 1, wherein a width (l) of the alignment pins in cross section decreases further away from a longitudinal axis of the device.

10. The device according to claim 1, wherein the alignment pins are received in longitudinal notches in each bar, which extend radially beyond the diameter of the central bore in the laminations.

11. The device according to claim 1, wherein the bars are designed to be moveable longitudinally, the device comprising notably a slope on the outer surface, the mandrel body comprising notably an outer surface inclined by an angle $\alpha$ in relation to a longitudinal axis of the vertical device.

12. The device according to claim 1, wherein the lamination sectors are grouped into sector packets, a first interface defined between two adjacent sector packets located at a first distance along the longitudinal axis of the device being angularly offset from a second interface defined between two adjacent sector packets located at a second distance along the longitudinal axis of the device, different from the first distance.

13. The device according to claim 1, wherein the device comprises a placement system for the lamination sectors.

14. A stator of a rotating electrical machine, comprising a lamination stack made using the device according to claim 1.

15. A pressing and gripping system for a lamination stack, obtained using the device according to claim 1, comprising one or more vertical clamps designed to be clamped onto a support plate for the sectors.

* * * * *